US012136769B2

(12) United States Patent
Blödt

(10) Patent No.: US 12,136,769 B2
(45) Date of Patent: Nov. 5, 2024

(54) ENCAPSULABLE ANTENNA UNIT

(71) Applicant: Endress+Hauser SE+Co. KG, Maulburg (DE)

(72) Inventor: Thomas Blödt, Steinen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 238 days.

(21) Appl. No.: 17/627,150

(22) PCT Filed: Jun. 18, 2020

(86) PCT No.: PCT/EP2020/066985
§ 371 (c)(1),
(2) Date: Jan. 14, 2022

(87) PCT Pub. No.: WO2021/013443
PCT Pub. Date: Jan. 28, 2021

(65) Prior Publication Data

US 2022/0278467 A1 Sep. 1, 2022

(30) Foreign Application Priority Data

Jul. 19, 2019 (DE) ..................... 10 2019 119 615.9

(51) Int. Cl.
*H01Q 21/28* (2006.01)
*H01Q 1/40* (2006.01)
(Continued)

(52) U.S. Cl.
CPC ............... *H01Q 21/28* (2013.01); *H01Q 1/40* (2013.01); *H01Q 5/335* (2015.01); *H01Q 9/04* (2013.01);
(Continued)

(58) Field of Classification Search
CPC .......... H01Q 21/28; H01Q 1/40; H01Q 5/335; H01Q 9/0407; H01Q 9/42; H01Q 1/002; H01Q 1/38; H01Q 9/04
See application file for complete search history.

(56) References Cited

U.S. PATENT DOCUMENTS 5,276,920 A * 1/1994 Kuisma ................ H04B 7/0805
455/277.1
5,799,245 A * 8/1998 Ohashi ................. H04B 7/0814
455/70
(Continued)

FOREIGN PATENT DOCUMENTS

WO 2015163880 A1 10/2015

*Primary Examiner* — Hai V Tran
(74) *Attorney, Agent, or Firm* — Mark A. Logan; Endress+Hauser (USA) Holding, Inc.

(57) ABSTRACT

An antenna unit for transmitting and receiving high frequency signals includes a substrate that is optionally encapsulable with a potting compound having a defined dielectric value. Arranged on the substrate are two planar antennas each tuned for the high frequency signal. The planar antennas are designed such that the values of the real parts of the impedances of the planar antennas differ by the square root of the dielectric value of the potting compound. By providing two antennas, wherein one thereof is impedance-matched to a possible potting compound encapsulation, the antenna unit is able to function independently of a possible potting compound encapsulation. Electronic modules which comprise the antenna unit for wireless communication can be implemented according to the platform principle in devices that require a potting compound encapsulation and also in devices that are not encapsulated.

11 Claims, 1 Drawing Sheet

(51) Int. Cl.

| | |
|---|---|
| ***H01Q 5/335*** | (2015.01) |
| ***H01Q 9/04*** | (2006.01) |
| ***H01Q 9/42*** | (2006.01) |
| *H01Q 1/00* | (2006.01) |

(52) U.S. Cl.
CPC ............ *H01Q 9/0407* (2013.01); *H01Q 9/42* (2013.01); *H01Q 1/002* (2013.01)

(56) References Cited

U.S. PATENT DOCUMENTS

| | | | | |
|---|---|---|---|---|
| 6,288,682 | B1 * | 9/2001 | Thiel | H01Q 9/32 343/702 |
| 6,529,749 | B1 * | 3/2003 | Hayes | H01Q 9/0421 343/702 |
| 10,290,927 | B2 * | 5/2019 | Lin | H01Q 1/243 |
| 2002/0098810 | A1 * | 7/2002 | Murakami | H01Q 1/243 455/575.7 |
| 2005/0225488 | A1 * | 10/2005 | Nakagawa | H01Q 9/30 343/702 |
| 2006/0109191 | A1 * | 5/2006 | Shtrom | H01Q 9/28 343/876 |
| 2010/0295569 | A1 * | 11/2010 | Chu | G01R 31/2822 324/750.01 |
| 2011/0304512 | A1 * | 12/2011 | Friederich | H01Q 1/243 343/702 |
| 2012/0119962 | A1 * | 5/2012 | Irie | G04G 17/04 343/904 |
| 2012/0313823 | A1 * | 12/2012 | Armstrong | H01Q 21/29 343/700 MS |
| 2013/0300618 | A1 * | 11/2013 | Yarga | H01Q 1/243 343/720 |
| 2014/0125540 | A1 * | 5/2014 | Tetsuno | H01Q 1/50 343/822 |
| 2014/0139380 | A1 * | 5/2014 | Ouyang | H01Q 5/314 343/702 |
| 2015/0084824 | A1 * | 3/2015 | Montgomery | H01Q 1/523 343/841 |
| 2016/0172753 | A1 * | 6/2016 | Tai | H04B 1/3838 455/418 |
| 2017/0047645 | A1 * | 2/2017 | Lin | H01Q 1/243 |
| 2019/0058247 | A1 * | 2/2019 | Matlin | H01Q 21/29 |

* cited by examiner

ENCAPSULABLE ANTENNA UNIT

CROSS-REFERENCE TO RELATED APPLICATIONS

The present application is related to and claims the priority benefit of German Patent Application No. 10 2019 119 615.9, filed on Jul. 19, 2019 and International Patent Application No. PCT/EP2020/066985, filed on Jun. 18, 2020, the entire contents of which are incorporated herein by reference.

TECHNICAL FIELD

The invention relates to an antenna unit encapsulable by means of a potting compound, especially such an antenna unit for use for field devices.

BACKGROUND

In process automation technology, field devices are often applied, which serve for determining or for influencing process variables. Serving for registering process variables are corresponding sensors, such as, for example, fill level measuring devices, flow measuring devices, pressure- and temperature measuring devices, and conductivity measuring devices, which register the corresponding process variables, fill level, flow, pressure, temperature, and conductivity. Moreover, also referred to as field devices are devices, which are applied near to a process and deliver, or process, process relevant information. In connection with the invention, considered as field devices are, consequently, also remote I/Os (electrical interfaces), and, in general, devices, which are arranged at the field level. A large number of such field devices are produced and sold by the firm, Endress+Hauser.

Besides data transmission by wire, field devices increasingly make use of wireless data transmission. This is used, for example, for sending measured values to superordinated controllers, or for parametering the field device from a handheld apparatus, for example, a tablet PC, smart phone, etc. A current wireless transmission standard can be used, especially one for communication with a handheld apparatus, for example, the Bluetooth standard IEEE 802.15 or a modified version thereof, especially Bluetooth Low Energy. For wireless data transmission, a field device must be equipped with a suitable antenna unit, in order to transmit, and receive, the corresponding signals.

Depending on field of application, at least certain electronic modules of a field device must, due to their special conditions of use, be encapsulated. This serves, on the one hand, to protect the electronic modules from environmental influences, such as dust, temperature or moisture. On the other hand, the encapsulation helps in the case that the fill level measurement apparatus must satisfy explosion protection specifications. Explosion protection specifications are established in Europe, among others, by the series of standards, EN 60079. In such case, encapsulation with a potting compound is often specified. This falls under explosion protection type "Ex-m" in the series of standards, EN 60079. For the potting of electronic components on a circuit board, a thermoplastic or an elastomer, for example, Silgel®, can be used.

In other fields of use, certain modules use no potting compound encapsulation, for example, for reasons of thermal management of their components, or just for reasons of cost.

Especially in the case of modules, which comprise an antenna unit, a possible potting compound encapsulation is, however, associated with considerable effort, in that the individual antennas must be adapted to the particular potting compound encapsulation, with which the antennas are to be covered. The corresponding modules can, thus, not be applied for different field device types intended for different fields of use. Therefore, it is not possible to design different field device types with wireless interface platform based.

SUMMARY

Accordingly, an object of the invention is to provide an antenna unit for electronic modules of field devices, which has a best possible transmitting/receiving characteristic both with, as well as also without, potting compound encapsulation.

The object is achieved according to the invention by an antenna unit for transmitting and/or receiving high frequency signals, which have a defined frequency. In such case, the antenna unit includes a substrate, which is encapsulable with a potting compound having a defined dielectric value. Arranged on the substrate according to the invention are at least components of the antenna unit as follows:

- a signal gate, via which the electrical, high frequency signal can be coupled in- and out,
- a first planar antenna, which is connected to the signal gate and which is tuned to the frequency of the high frequency signal,
- a second planar antenna, which is connected to the signal gate and which is tuned to the frequency of the high frequency signal.

In such case, the planar antennas are so designed that the impedance of the first planar antenna, especially the real part of the impedance, differs from the impedance of the second planar antenna by a defined factor, which corresponds to the square root of the dielectric value of the potting compound.

Because of the construction of the invention with two impedance differently designed antennas, the antenna unit utilizes the effect that one of the planar antennas is optimized for potting compound encapsulation, while the other planar antenna is designed for free radiation without potting compound encapsulation. In such case, the impedance difference $\sqrt{DK_{potting\ compound}}$ between the impedances of the planar antennas effects that in the case of present potting compound encapsulation predominantly the high ohm planar antenna is active, while the radiating/receiving of the low ohm planar antenna is suppressed. In the case of non-present potting compound encapsulation, the behavior is exactly the opposite.

In order, in each case, that the inactive planar antenna consumes no signal power, a signal splitter can be supplementally arranged between the signal gate and the planar antennas. This serves to supply the high frequency signal to the first planar antenna at that wavelength, which corresponds to the frequency of the high frequency signal at the dielectric value of the potting compound. Similarly, the signal splitter is to be so constructed that it supplies the high frequency signal to the second planar antenna at that wavelength, which corresponds to the frequency of the high frequency signal at the dielectric value of air or vacuum. By the selecting the particular active planar antenna, the signal splitter further increases the efficiency of the out- and in-coupling of the high frequency signal.

In the context of the invention, it is not fixedly prescribed, how the signal splitter is to be embodied, in order to lead the high frequency signal selectively to the appropriate antenna. By way of example, the signal splitter can be implemented in the following way:

it has a first signal path, which is arranged between the signal gate and the planar antennas and has a defined first path length, wherein the first path length corresponds to half the wavelength of the frequency of the high frequency signal at the dielectric value of the potting compound, or to a whole numbered multiple thereof, and it has a second signal path, which is arranged in parallel with the first signal path between the signal gate and the second planar antenna and has a defined second path length, wherein the second path length corresponds to half the wavelength of the frequency of the high frequency signal at the dielectric value of air or vacuum, or to a whole numbered multiple thereof.

According to the functional principle of a Wilkinson divider, however, with unequal impedances of the invention, i.e. unequal line lengths, the signal splitter can be designed such that it comprises a defined resistance, which is arranged between the first planar antenna and the second planar antenna, wherein the magnitude of the resistance corresponds especially at least to the input resistance of the antenna unit at the signal gate.

Alternatively or supplementally, the first signal path and the second signal path can comprise defined reflection sites for the high frequency signals and their frequency. In such case, the reflection site can, for example, especially be embodied as a right angled path or as a gap. The reflection site acts, in such case, as a wavelength-dependent bandpass filter, such that thereby, in turn, the selectivity between the planar antennas is increased.

For the case, in which the first signal path has at least two reflection sites, instead of the total-path length also the first path length between these two reflection sites can correspond to half the wavelength of the frequency of the high frequency signal at the dielectric value of the potting compound, or to a whole numbered multiple thereof. The same holds for the second signal path: for the case, in which the second signal path has at least two reflection sites, the second path length between the two reflection sites can correspond to half the wavelength of the frequency of the high frequency signal at the dielectric value of air, or vacuum, or to a whole numbered multiple thereof.

In principle, the design of the planar antennas is not prescribed within the context of the invention either. For example, the first planar antenna and/or the second planar antenna can be designed as patch antennas or linear antennas. In such case, the first planar antenna preferably has an (edge-) length corresponding to half the wavelength of the frequency of the high frequency signal at the dielectric value of the potting compound, or to a whole numbered multiple thereof. Similarly, the second planar antenna preferably has an (edge-) length corresponding to half the wavelength of the frequency of the high frequency signal at the dielectric value of air or vacuum, or to a whole numbered multiple thereof.

When one of the planar antennas is embodied as a linear antenna, an extension of the linear antenna can have an especially right angled extension connected with a ground connection. In such case, the right angled extension of the first planar antenna is preferably provided with a length corresponding to half the wavelength of the frequency of the high frequency signal at the dielectric value of the potting compound, or to a whole numbered multiple thereof. Analogously thereto, a right angled extension of the second planar antenna is, in this case, preferably provided with a length corresponding to half the wavelength of the frequency of the high frequency signal at the dielectric value of air or vacuum, or to a whole numbered multiple thereof.

Functioning as substrate for the antenna unit of the invention can be a circuit board, for example. Accordingly, the signal gate, the planar antennas and/or signal splitter can be implemented as a conductive trace structure. Thus, arranged on the circuit board besides the antenna unit can be complete electronic modules for different field device types. In order to be able to function as antenna unit for Bluetooth-based communication, the planar antennas are designed such that the high frequency signal has a frequency in the region between 2 GHz and 3 GHz, such as used for Bluetooth-based communication.

Of course, not only field devices can have an antenna unit of the invention built according to at least one of the above described embodiments. Rather, the antenna unit can, in principle, be used in any electronic apparatus that has a wireless interface, and its electronic modules can, in given cases, be potted.

BRIEF DESCRIPTION OF THE DRAWINGS

The invention will now be explained in greater detail based on the appended drawing, the figures of which show as follows.

DETAILED DESCRIPTION

Figure 1:
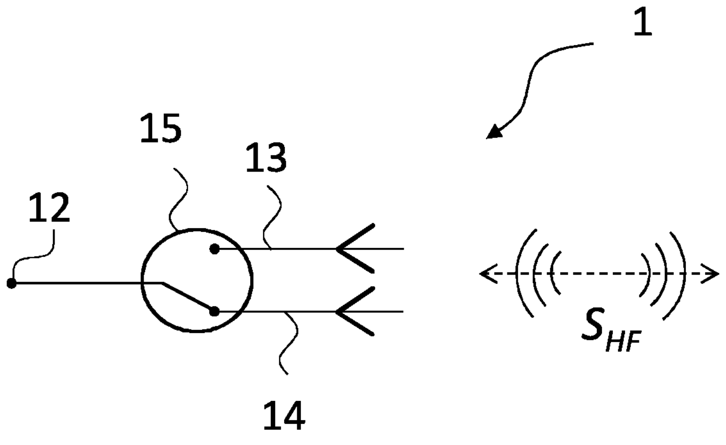
FIG. 1 shows an equivalent circuit diagram of the antenna unit of the present disclosure.

For providing a general understanding of the invention, FIG. 1 shows an equivalent circuit diagram of the antenna unit 1. As is shown, antenna unit 1 includes as essential electrical components two planar antennas 13, 14, which in the case of the shown embodiment are connected via a signal splitter 15 with a signal gate 12. For transmitting and for receiving high frequency signals SHE, which are formed, for example, according to the Bluetooth standard, a correspondingly designed signal production unit/signal evaluation unit (not shown), is connected to the signal gate 12.

The two planar antennas 13, 14 are adapted to operate at the frequency f of the high frequency signal SHE, thus, in the case of Bluetooth communication, at a frequency between 2 GHz and 3 GHz. Depending on the type of planar antennas 13, 14, for example, linear antennas or patch antennas, the impedance depends on the particular geometric dimensions of the planar antennas 13, 14. According to the invention, the planar antennas 13, 14 are, moreover, however, so designed that the real part of the impedance of the first planar antenna 13 differs by a defined factor $\sqrt{DK_{pc}}$ from the real part of the impedance of the second planar antenna 14. In such case, the factor $\sqrt{DK_{pc}}$ corresponds according to the invention to the square root of the dielectric value $DK_{pc}$ of the chosen potting compound. In such case, the dielectric value of a thermoplastic or thermosetting potting compound lies, as a rule, in a range between 2 $F{*}m^{-1}$ and 3 $F{*}m^{-1}$, in rare cases also up to 15 $F{*}m^{-1}$.

Thus, the two planar antennas 13, 14 are, indeed, designed for the frequency f of the high frequency signal $S_{HF}$. The propagation velocity $c_{pc}$, $c_0$ of the high frequency signal $S_{HF}$ in the planar antennas 13, 14 depends, however, on the medium that surrounds the planar antennas 13, 14 in the radiation direction, thus, within the scope of the invention either a potting compound or air, or vacuum. Accordingly, there results in the planar antennas 13, 14, in spite of equal frequency f of the high frequency signal $S_{HF}$, depending on whether a potting compound covers the antenna unit 1 or not, a wavelength $\lambda_{pc,0}$ dependent on the potting compound, based on the formula $$c_{pc,0}=\lambda_{pc,0}*f.$$

Due to the impedance difference of the invention between the planar antennas 13, 14, in the case of present potting compound, the high frequency signal $S_{HF}$ is accordingly transmitted predominantly by that planar antenna 13, 14, which has, with reference to the real part, the higher impedance, i.e. is best matched to the output-impedance of the unit connected to the signal gate. In the case of potting compound free design of the antenna unit 1, i.e. of the module, the behavior is accordingly in an exactly opposite manner: In such case, the high frequency signal $S_{HF}$ is transmitted predominantly by that planar antenna 13, 14, which has the lower impedance in the real part. In this way, the high frequency signal $S_{HF}$ is thus transmitted, and received, depending on the possibly present potting compound, virtually selectively by that of the planar antennas 13, 14, whose impedance is better matched to the particular situation.

Figure 2:
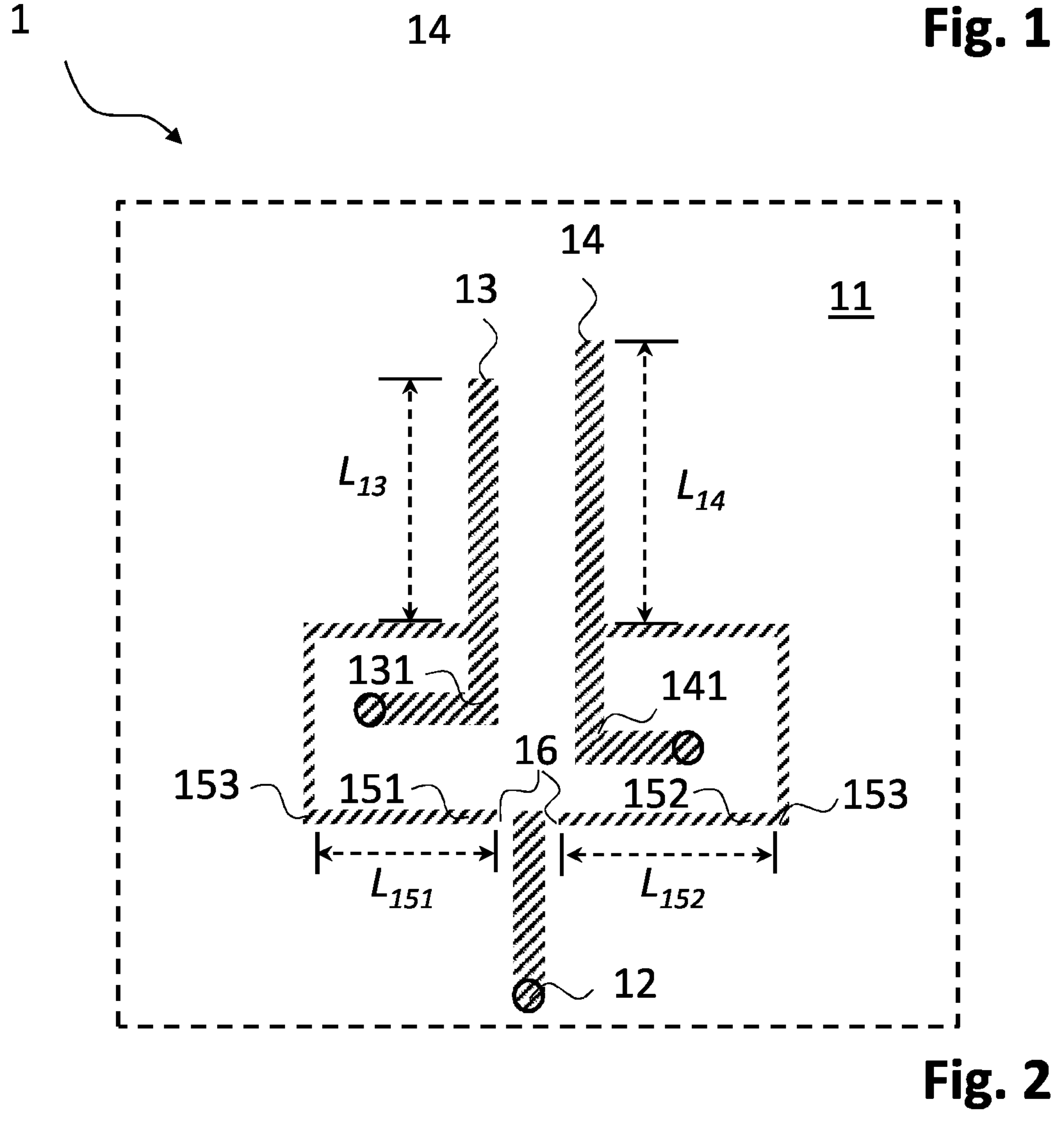
FIG. 2 shows a plan view of a possible embodiment of the antenna unit.

This selective transmitting and/or receiving of the high frequency signal $S_{HF}$ according to the invention via predominantly one of the two planar antennas 13, 14 is, in the case of the embodiment of the antenna unit 1 shown in FIGS. 1 and 2, further supported by the signal splitter 15. For this, the signal splitter 15 connects the signal gate 12 either with the first planar antenna 13 or with the second planar antenna 14, depending on whether the antenna unit 1 is encapsulated with a potting compound or not. In such case, the signal splitter 15 switches analogously to the planar antennas 13, 14, upon present potting compound, through that planar antenna 13, 14, which, with reference to the real part, has the higher impedance. In the case of potting compound not present, the signal splitter 15 switches correspondingly through the low ohm planar antenna 13, 14.

A possible embodiment of the signal splitter 15 is shown in FIG. 2: It includes a first signal path 151, which is arranged between the signal gate 12 and the first planar antenna 13, as well as a second signal path 152, which is arranged between the signal gate 12 and the second planar antenna 14.

In such case, the two signal paths 151, 152 have in defined subregions different path lengths $L_{151}$, $L_{152}$. The path length $L_{151}$ in the subregion of the first signal path 151 is dimensioned corresponding to half the wavelength $\lambda_{pc}$ of the frequency f of the high frequency signal $S_{HF}$ at the dielectric value $DK_{pc}$ of the potting compound, or in practice due to the short wavelength in the mm range to a whole numbered multiple thereof. Analogously thereto, the path length $L_{152}$ in the corresponding subregion of the second signal path 152 is dimensioned corresponding to half the wavelength $\lambda_0$ of the frequency f of the high frequency signal $S_{HF}$ at the dielectric value $DK_0$ of air or vacuum, or, again, to a whole numbered multiple thereof. Because of this dimensioning of the path lengths $L_{151}$, $L_{152}$, the high frequency signal $S_{HF}$ is led either predominantly via the first signal path 151 or the second signal path 152, depending on whether the antenna unit 1 is encapsulated with a potting compound or not.

The subregions, in which the signal paths 151, 152 are dimensioned with the above described path lengths $L_{151}$, $L_{152}$, are bounded in the case variant of the signal splitter 15 shown in FIG. 2 by, in each case, two reflection sites 16, 153. In such case, the reflection site 16 is embodied as a gap 16 toward the signal gate 12. The second reflection site 153, is embodied, in each case, in the form of a right angle 153 in the signal path. The implementing of the signal splitter 15 with reflection sites 16, 153 offers the advantage that the selectivity between the planar antennas 13, 14 is further improved. In contrast with FIG. 2, the signal paths 151, 152 can also be implemented without reflection sites. In such case, the path lengths $L_{151}$, $L_{152}$ of the total signal paths 151, 152 are to be dimensioned corresponding to half the wavelength $\lambda_{pc,0}$ of the frequency f of the high frequency signal $S_{HF}$ at the dielectric value $DK_{pc,0}$ of the potting compound, or air/vacuum, as the case may be, or, again, to a whole numbered multiple thereof.

In the case of the embodiment shown in FIG. 2, the planar antennas 13, 14 are designed as linear antennas, wherein the value of the real part of the impedance of the first planar antenna 13 differs from the value of the real part of the impedance of the second planar antenna 14 by the square root of the dielectric value $DK_{pc}$ of the potting compound. For this, the first linear antenna 13 is dimensioned with a length Lia corresponding to half the wavelength $\lambda_{pc}$ of the frequency f of the high frequency signal ($S_{HF}$) at the dielectric value ($DK_{pc}$) of the potting compound, or to a whole numbered multiple thereof. Analogously thereto, the second linear antenna 14 is dimensioned with a length $L_{14}$ corresponding to half the wavelength $\lambda_0$ of the frequency f of the high frequency signal $S_{HF}$ at the dielectric value $DK_0$ of air or vacuum, or, again, to a whole numbered multiple thereof.

The selective transmitting/receiving of the high frequency signal $S_{HF}$ as a function of the possible potting compound is thus achieved according to the invention because of the different lengths of the linear antennas 13, 14. In contrast with the shown embodiment, the planar antennas 13, 14 can also be designed as block shaped patch antennas. In such case, the edge lengths of the patch antennas are dimensioned analogously to the lengths $L_{13}$, $L_{14}$ of the linear antennas 13, 14 described in connection with FIG. 2.

As is shown in FIG. 2, the first linear antenna 13 and the second linear antenna 14 are connected in this embodiment of the antenna unit 1 via a right angled extension 131, 141 with a ground connection. Analogously to the linear antennas 13, 14, also the right angled extension 131 of the first planar antenna 13 is dimensioned with a length corresponding to half the wavelength $\lambda_{pc}$ of the frequency f of the high frequency signal $S_{HF}$ at the dielectric value $DK_{pc}$ of the potting compound, or to a whole numbered multiple thereof; and the right angled extension 141 of the second planar antenna 14 is dimensioned with a length corresponding to half the wavelength $\lambda_0$ of the frequency f of the high frequency signal $S_{HF}$ at the dielectric value $DK_0$ of air or vacuum, or to a whole numbered multiple thereof. Because of this type of grounding of the linear antennas 13, 14, it is possible to dimension the linear antennas 13, 14, as a whole, compactly, without having to sacrifice transmitting/receiving efficiency.

The substrate 11 shown in FIG. 2, on which the planar antennas 13, 14, the signal splitter and the signal gate 12 of the antenna unit 1 are arranged, can be, for example, a circuit board 11. In such case, there can be arranged on such circuit board 11 besides the antenna unit 1 also other electronic components of the relevant electronics module. Accordingly, the signal splitter 15 and the planar antennas 13, 14 can be embodied, for example, as copper- or gold-based, conductive traces. The signal gate 12 and the ground connections of the extensions 131, 141 can, such as shown in FIG. 2, be implemented as electrical vias through the circuit board 11. Because of the planar design of the components 12, 13, 14, 15, the antenna unit 1 can, thus, depending on application, be encapsulated on the surface of the circuit board 11 by an appropriately thin, (continuous) potting compound.

The invention claimed is:

1. An antenna unit for transmitting and receiving high frequency signals having a defined frequency, comprising:

a substrate;

a signal gate via which the high frequency signals can be coupled in and out;

a first planar antenna connected to the signal gate and tuned to the frequency of the high frequency signals;

a second planar antenna connected to the signal gate and tuned to the frequency of the high frequency signals; and a signal splitter arranged between the signal gate and the planar antennas and designed to supply the high frequency signals to the first planar antenna at a wavelength corresponding to a frequency of the high frequency signals at the dielectric value of the potting compound, wherein the signal gate, the first planar antenna, and the second planar antenna are arranged on the substrate, wherein the planar antennas are so designed that a real part of an impedance of the first planar antenna differs from a real part of an impedance of the second planar antenna by a defined factor corresponding to a square root of a dielectric value of a potting compound, wherein the signal splitter is designed to supply the high frequency signals to the second planar antenna at a wavelength corresponding to a frequency of the high frequency signals at a dielectric value of air or vacuum, and wherein the signal splitter includes:

a first signal path arranged between the signal gate and the first planar antenna and having a defined first path length corresponding to half the wavelength or to a whole numbered multiple of half the wavelength of the frequency of the high frequency signals at the dielectric value of the potting compound; and a second signal path arranged in parallel with the first signal path between the signal gate and the second planar antenna and having a defined second path length corresponding to half the wavelength or to a whole numbered multiple of half the wavelength of the frequency of the high frequency signals at the dielectric value of air or vacuum.

2. The antenna unit as claimed in claim 1, wherein the signal splitter includes a defined resistance arranged between the first planar antenna and the second planar antenna, and wherein the magnitude of the resistance corresponds to an input resistance of the antenna unit at the signal gate.

3. The antenna unit as claimed in claim 1, wherein the first signal path and the second signal path each includes at least one defined reflection site for the high frequency signals.

4. The antenna unit as claimed in claim 3, wherein the at least one reflection site is embodied as a right angled extension or as a gap.

5. The antenna unit as claimed in claim 1, wherein the first signal path includes two reflection sites, and wherein a first path length between the two reflection sites in the first signal path corresponds to half the wavelength or to a whole numbered multiple of half the wavelength of the frequency of the high frequency signal at the dielectric value of the potting compound, and wherein the second signal path includes two reflection sites, and wherein a second path length between the two reflection sites in the second signal path corresponds to half the wavelength or to a whole numbered multiple of half the wavelength of the frequency of the high frequency signal at the dielectric value of air or vacuum.

6. The antenna unit as claimed in claim 1, wherein the first planar antenna and/or the second planar antenna is/are designed as a patch antenna or as patch antennas.

7. The antenna unit as claimed in claim 1, wherein the planar antennas are designed as linear antennas, wherein the first planar antenna is dimensioned with a length corresponding to half the wavelength or to a whole numbered multiple of half the wavelength of the frequency of the high frequency signal at the dielectric value of the potting compound, and wherein the second planar antenna is dimensioned with a length corresponding to half the wavelength or to a whole numbered multiple of half the wavelength of the frequency of the high frequency signal at the dielectric value of air or vacuum.

8. The antenna unit as claimed in claim 7, wherein an extension or extensions of the first planar antenna and/or the second planar antenna are/is connected via a right angled extension with a ground connection, wherein the right angled extension of the first planar antenna is dimensioned with a length corresponding to half the wavelength or to a whole numbered multiple of half the wavelength of the frequency of the high frequency signal at the dielectric value of the potting compound, and/or wherein the right angled extension of the second planar antenna is dimensioned with a length corresponding to half the wavelength or to a whole numbered multiple of half the wavelength of the frequency of the high frequency signal at the dielectric value of air or vacuum.

9. The antenna unit as claimed in claim 1, wherein the substrate is embodied as a circuit board, and wherein the signal gate, the planar antennas, and/or signal splitter are implemented as a conductive trace structure.

10. The antenna unit as claimed in claim 1, wherein the planar antennas are adapted such that the high frequency signal has a frequency in the range between 300 MHz and 6 GHz.

11. A process automation field device, comprising:

an antenna unit for transmitting and receiving high frequency signals having a defined frequency, including:

a substrate;

a signal gate via which the high frequency signals can be coupled in and out;

a first planar antenna connected to the signal gate and tuned to the frequency of the high frequency signals;

a second planar antenna connected to the signal gate and tuned to the frequency of the high frequency signals; and a signal splitter arranged between the signal gate and the planar antennas and designed to supply the high frequency signals to the first planar antenna at a wavelength corresponding to a frequency of the high frequency signals at the dielectric value of the potting compound, wherein the signal gate, the first planar antenna, and the second planar antenna are arranged on the substrate, wherein the planar antennas are so designed that a real part of an impedance of the first planar antenna differs from a real part of an impedance of the second planar antenna by a defined factor corresponding to a square root of a dielectric value of a potting compound, wherein the signal splitter is designed to supply the high frequency signals to the second planar antenna at a wavelength corresponding to a frequency of the high frequency signals at a dielectric value of air or vacuum, and wherein the signal splitter includes:

a first signal path arranged between the signal gate and the first planar antenna and having a defined first path length corresponding to half the wavelength or to a whole numbered multiple of half the wavelength of the frequency of the high frequency signals at the dielectric value of the potting compound; and a second signal path arranged in parallel with the first signal path between the signal gate and the second planar antenna and having a defined second path length corresponding to half the wavelength or to a whole numbered multiple of half the wavelength of the frequency of the high frequency signals at the dielectric value of air or vacuum.

* * * * *